(12) United States Patent
Lee et al.

(10) Patent No.: US 11,745,626 B2
(45) Date of Patent: Sep. 5, 2023

(54) DUAL GEAR TYPE RECLINER DEVICE FOR A VEHICLE SEAT

(71) Applicants: HYUNDAI MOTOR COMPANY, Seoul (KR); KIA CORPORATION, Seoul (KR); DAS CO., LTD, Gyeongju-si (KR)

(72) Inventors: Seung-Young Lee, Seoul (KR); Dong-Woo Jeong, Gwacheon-si (KR); Ki-Ryung Lee, Seongnam-si (KR); Sang-Ho Kim, Incheon (KR); Ho-Jin Jung, Suwon-si (KR)

(73) Assignees: HYUNDAI MOTOR COMPANY, Seoul (KR); KIA CORPORATION, Seoul (KR); DAS CO., LTD, Gyeongju-si (KR)

( * ) Notice: Subject to any disclaimer, the term of this patent is extended or adjusted under 35 U.S.C. 154(b) by 184 days.

(21) Appl. No.: 17/225,827

(22) Filed: Apr. 8, 2021

(65) Prior Publication Data
US 2022/0111771 A1    Apr. 14, 2022

(30) Foreign Application Priority Data
Oct. 12, 2020    (KR) .......................... 10-2020-0130935

(51) Int. Cl.
*B60N 2/22* (2006.01)
*B60N 2/02* (2006.01)

(52) U.S. Cl.
CPC ......... *B60N 2/2231* (2013.01); *B60N 2/0232* (2013.01); *B60N 2002/0236* (2013.01)

(58) Field of Classification Search
CPC ...... B60N 2/2231; B60N 2/22; B60N 2/2213; B60N 2/3009; B60N 2/0232; B60N 2/0224; B60N 2/206; B60N 2/34; B60N 2002/0236; B60N 2002/024
USPC .......................................................... 297/362
See application file for complete search history.

(56) References Cited

U.S. PATENT DOCUMENTS

| | | | |
|---|---|---|---|
| 5,997,090 A * | 12/1999 | Baloche | B60N 2/0292 |
| | | | 297/367 R |
| 6,499,712 B1 * | 12/2002 | Clark | B63B 29/04 |
| | | | 248/424 |
| 7,114,779 B2 * | 10/2006 | Thiel | B60N 2/22 |
| | | | 297/378.12 |

(Continued)

FOREIGN PATENT DOCUMENTS

WO    03104019 A1    12/2003

*Primary Examiner* — Mark R Wendell
(74) *Attorney, Agent, or Firm* — LEMPIA SUMMERFIELD KATZ LLC

(57) ABSTRACT

A dual gear type recliner device includes a recliner device having a hinge structure applied to an intermediate section of a seat and configured to form a fixed end hinge point with a seatback frame of a seatback and form a free end hinge point with a cushion frame and configured to impart movements of folding and unfolding to the seatback. The dual gear type recliner device further includes a controller configured to output motor control signals to a cushion motor and a seatback motor and to generate the movements of the folding and the unfolding. Therefore, two drivers are integrated into one device to improve the degree of freedom in designing an outer circumference of the seat and built in a gear box to perform a large angle adjustment so that a back table mode and a leg rest mode can be easily implemented.

17 Claims, 7 Drawing Sheets

(56) References Cited

U.S. PATENT DOCUMENTS

| | | | | |
|---|---|---|---|---|
| 7,845,729 B2* | 12/2010 | Yamada | ............... | B60N 2/0232 |
| | | | | 297/354.11 |
| 8,056,981 B2* | 11/2011 | Kojima | ............... | B60N 2/2356 |
| | | | | 297/362.11 |
| 9,969,306 B1* | 5/2018 | Lin | ...................... | B60N 2/2352 |
| 11,400,836 B2* | 8/2022 | Epaud | ................. | B60N 2/3065 |
| 2006/0152058 A1* | 7/2006 | Pejathaya | ........... | B60N 2/0232 |
| | | | | 297/378.12 |
| 2007/0158989 A1* | 7/2007 | Ishizuka | ............... | B60N 2/206 |
| | | | | 297/378.1 |
| 2011/0012413 A1* | 1/2011 | Du | ...................... | B60N 2/2252 |
| | | | | 297/362 |
| 2015/0375643 A1* | 12/2015 | Fisher | ................. | B60N 2/3022 |
| | | | | 297/334 |
| 2020/0215935 A1* | 7/2020 | Maekawa | ............... | B60N 2/20 |
| 2021/0206299 A1* | 7/2021 | Line | .................... | B60N 2/0232 |
| 2022/0032819 A1* | 2/2022 | Park | ....................... | B60N 2/20 |

* cited by examiner

DUAL GEAR TYPE RECLINER DEVICE FOR A VEHICLE SEAT

CROSS-REFERENCE(S) TO RELATED APPLICATIONS

This application claims priority to Korean Patent Application No. 10-2020-0130935, filed on Oct. 12, 2020, which is incorporated herein by reference in its entirety.

BACKGROUND OF PRESENT DISCLOSURE

Field of Present Disclosure

Specific embodiments of the present disclosure relate to a recliner device. More particularly, it relates to a vehicle seat to which a dual gear type recliner device is applied, wherein the dual gear type recliner device improves the degree of freedom in designing an outer circumference of a seat and implements a back table mode and a leg rest mode which are suitable for a future autonomous vehicle by integrating two upper and lower drivers into one device in a dual gear method.

Description of Related Art

Generally, a vehicle seat has a recliner device, and a seatback can be folded or tilted against a seat cushion to be adjusted to fit a body shape of an occupant.

To this end, the recliner device is divided into a single recliner device and a double recliner device.

For example, the double recliner device includes a seat cushion constituting a seat as a lower driver and a seatback connected to a cushion as an upper driver, which are mounted on both sides of the seat, respectively. The double recliner device implements a folding operation (i.e., folding) or an unfolding operation (i.e., unfolding) against the cushion by setting the seatback as one pivoting point.

Therefore, in an operation of folding the seatback forward (i.e., folding) or unfolding the seatback rearward (i.e., unfolding) while adjusting the seatback to a seat attitude fitting to a body shape, the double recliner device has a structural advantage of easily adjusting a pivoting angle as compared with the single recliner device.

However, for a function of folding a seatback (i.e., folding/unfolding), the double recliner device is formed on both left and right lateral surfaces of the seat so that, as compared with the single recliner device, the degree of freedom of a seat design is inevitably low and excessive increases in material cost and weight occurs inevitably.

In addition, owing to a structure in which the seatback has one pivoting point, in addition to conventional folding/unfolding operations, it is inevitably difficult for the double recliner device to implement various modes. For example, in a back folding mode, a front view is secured and a table function and a large luggage fixing function are possible in a back table mode, and in a full flat mode, an occupant can stretch his or her legs in a leg rest mode.

In an embodiment, the difficulty of implementing various modes inevitably has an aspect of implementing a seat development concept suitable for a future autonomous vehicle requiring that the seatback should be freely transformed to efficiently utilize an interior space.

SUMMARY OF PRESENT DISCLOSURE

An embodiment of the present disclosure is directed to a dual gear type recliner device for a vehicle seat, which is formed of a double recliner device integrated into one device by integrating upper and lower drivers in a double gear method. The dual gear type recliner device for the vehicle seat is capable of improving the degree of freedom in designing an outer circumference of a seat, and particularly, is capable of adjusting an angle of a seatback in a dual gear integrated structure of applying a motor and a reduction gear in a gearbox module in which the two upper and lower drivers are arranged in a central portion thereof. Thus, a back table mode and a leg rest mode, which are suitable for a future autonomous vehicle, may be implemented.

Other objects and advantages of the present disclosure should be understood by the following description and become apparent with reference to the embodiments of the present disclosure. Also, it should be apparent to those having ordinary skill in the art to which the present disclosure pertains that the objects and advantages of the present disclosure can be realized by the means as claimed and combinations thereof.

In accordance with an embodiment of the present disclosure, a recliner device includes a dual gear box module provided in a connection portion at a position of an intermediate section of a width between a seat cushion, in which a cushion frame is built, and a seatback, in which a seatback frame is built. The recliner device is configured to form a free end hinge point with the cushion frame to block a movement of the cushion frame and form a fixed end hinge point with the seatback frame to allow the seatback to be folded or unfolded with respect to the seat cushion due to a movement of the seatback frame.

As an embodiment, the dual gear box module may include: an upper rotating device formed such that the fixed end hinge point is connected to left and right portions of the seatback frame; a lower rotating device formed such that the free end hinge point is connected to left and right portions of the cushion frame; and a gear box having an inner space configured to accommodate the upper rotating device and the lower rotating device. The upper rotating device may be located upward in the inner space and the lower rotating device is located downward in the inner space.

As an embodiment, the upper rotating device may include a seatback motor; a seatback power transmission shaft configured to switch a rotation direction of the seatback motor; and a seatback output shaft configured to match a rotation direction of the seatback power transmission shaft to the rotation direction of the seatback motor and generate a movement in the seatback frame.

As an embodiment, the seatback motor and the seatback output shaft may be horizontally arranged to form a separation gap from each other. The seatback power transmission shaft may be vertically arranged with respect to the seatback motor and the seatback output shaft to form a gear engagement structure and receive a rotation from the seatback motor to transmit the rotation to the seatback output shaft in the gear engagement structure.

As an embodiment, the seatback power transmission shaft may form the gear engagement structure with a first seatback power transmission shaft and a second seatback power transmission shaft. The first seatback power transmission shaft may form a lower end rod worm wheel engaged with a left motor shaft worm of the seatback motor and an upper end rod worm engaged with a left pipe worm wheel of the seatback output shaft. The second seatback power transmission shaft may form a lower end rod worm wheel engaged with a right motor shaft worm of the seatback motor and an upper end rod worm engaged with a right pipe worm wheel of the seatback output shaft.

As an embodiment, each of the seatback motor and the seatback output shaft may be fitted into an elastic piece protruding in the inner space of the gear box to form a fixing force. The seatback motor and the seatback output shaft may be supported on bearings on both left and right lateral portions of the gear box. The seatback power transmission shaft may be supported on a shaft end holder fitted into a hook protruding in the inner space of the gear box.

As an embodiment, the lower rotating device may include: a cushion motor; a cushion power transmission shaft configured to switch a rotation direction of the cushion motor; and a cushion output shaft configured to match a rotation direction of the cushion power transmission shaft to the rotation direction of the cushion motor to be freely rotated with respect to the cushion frame.

As an embodiment, the cushion motor and the cushion output shaft may be horizontally arranged to form a separation gap from each other. The cushion power transmission shaft may be vertically arranged with respect to the cushion motor and the cushion output shaft to form a gear engagement structure and receive a rotation from the cushion motor to transmit the rotation to the cushion output shaft in the gear engagement structure.

As an embodiment, the cushion power transmission shaft may form the gear engagement structure with a first cushion power transmission shaft and a second cushion power transmission shaft. The first cushion power transmission shaft may form a lower end rod worm wheel engaged with a left motor shaft worm of the cushion motor and an upper end rod worm engaged with a left pipe worm wheel of the cushion output shaft. The second cushion power transmission shaft may form a lower end rod worm wheel engaged with a right motor shaft worm of the cushion motor and an upper end rod worm engaged with a right pipe worm wheel of the cushion output shaft.

As an embodiment, each of the cushion motor and the cushion output shaft may be fitted into an elastic piece protruding in the inner space of the gear box to form a fixing force. The cushion motor and the cushion output shaft may be supported on bearings on both left and right lateral portions of the gear box. The cushion power transmission shaft may be supported on a shaft end holder fitted into a hook protruding in the inner space of the gear box.

As an embodiment, the gear box may include a front case and a rear case, the inner space may be formed due to a coupling of the front case and the rear, and the front case and the rear case may be fixed and assembled by an engagement part.

As an embodiment, the folding may be performed such that the seatback is superposed on the seat cushion through back folding, and the unfolding may be performed such that the seatback is tilted from the seat cushion in a full flat state.

In accordance with another embodiment of the present disclosure, a vehicle seat includes a recliner device forming a hinge structure configured to perform folding and unfolding in an intermediate section of a width of a seatback in which the folding and the unfolding are performed with respect to a seat cushion. The hinge structure forms a fixed end hinge point with a seatback frame of the seatback to impart movements of the folding and the unfolding to the seatback. Meanwhile, the hinge structure forms a free end hinge point with a cushion frame of the seat cushion to block movements of the cushion frame and the seat cushion. The seat further includes a controller configured to output a cushion motor control signal for driving a cushion motor of the recliner device and a seatback motor control signal for driving a seatback motor of the recliner device and generate the movements of the folding and the unfolding.

As an embodiment, the controller may perform rotation direction control for each of the seatback motor and the cushion motor and implement, through the rotation direction control, a back table mode in which the seatback is superposed on the seat cushion through back folding in the folding, and a leg rest mode in which the seatback is tilted from the seat cushion in a full flat state in the unfolding.

As an embodiment, the folding may include an inclination mode in which the seatback is inclined at a predetermined angle in an intermediate operation of the back folding by reducing an output to each of the seatback motor and the cushion motor.

DESCRIPTION OF SPECIFIC EMBODIMENTS

Specific embodiments of the present disclosure are described below in more detail with reference to the accompanying drawings. These embodiments are examples of the present disclosure and may be embodied in various other different forms by those having ordinary skill in the art to which the present disclosure pertains so that the present disclosure is not limited to these embodiments. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation or function.

Figure 1:
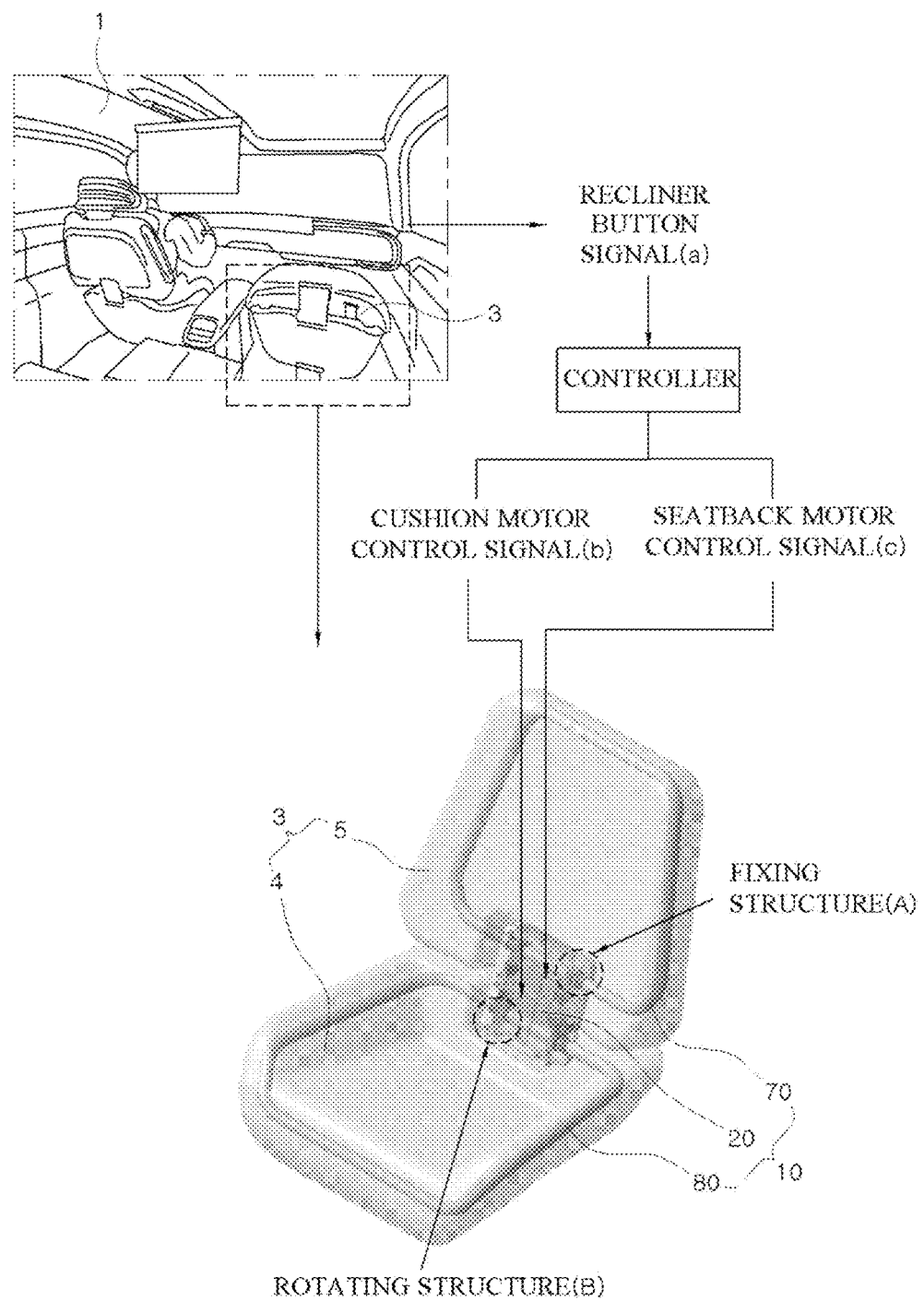
FIG. 1 is a configurational diagram illustrating a dual gear type recliner device applied to a vehicle seat according to the present disclosure.

Referring to FIG. 1, a vehicle 1 is provided with a seat 3 to which a recliner device 10 is applied.

For example, the seat 3 includes a seat cushion 4 on which a passenger sits and a seatback 5 configured to support the passenger so that the seat cushion 4 and the seatback 5 are the same as those of a conventional vehicle seat.

However, there is a difference in that, in the seat cushion 4, a cushion frame 80 constituting a cushion framework is connected to a lower portion of the recliner device 10, whereas, in the seatback 5, a seatback frame 70 constituting a seatback framework is connected to an upper portion of the recliner device 10.

For example, the seat cushion 4 is connected to the seatback 5 so that the recliner device 10 is integrated with the seat 3, and a dual gear box module 20 includes an upper rotating device 30 connected to the seatback frame 70 of the seatback 5 and a lower rotating device 40 connected to the cushion frame 80 of the seat cushion 4.

In an embodiment, since the upper rotating device 30 is located in an intermediate section of the seatback frame 70, and the lower rotating device 40 is located in an intermediate section of the cushion frame 80, the seatback frame 70 and the cushion frame 80 are connected in an intermediate portion of the seat 3 so that the recliner device 10 operates to allow the seatback 5 to be folded or unfolded against the seat cushion 4.

Thus, the recliner device 10 may be located in an intermediate section of the seat 3 and may fold or tilt the seatback 5 in the intermediate section of the seat 3 to the seat cushion 4 or may unfold the seatback 5 from the seat cushion 4.

In addition, the upper rotating device 30 is fixed to the seatback frame 70 through force-fitting or a welding structure, whereas the lower rotating device 40 is freely rotated with respect to the cushion frame 80.

Therefore, the upper rotating device 30 and a fixed end hinge point A of the seatback frame 70 move the seatback frame 70 in a rotation direction to allow the seatback 5 to be folded/unfolded. The lower rotating device 40 and a free end hinge point B of the cushion frame 80 prevent the seat cushion 4 from interfering with the folding/unfolding of the seatback 5.

In addition, the recliner device 10 is linked with a controller 90. The controller 90 recognizes a recliner button signal (a) according to an operation of a button provided in a cluster of a driver's seat, a door, or the seat 3 of the vehicle 1. The controller 90 drives a cushion motor 41 (see FIGS. 2 and 3) of the lower rotating device 40 with a cushion motor control signal (b) after recognizing the recliner button signal (a). The controller 90 drives a seatback motor 31 (see FIGS. 2 and 3) of the upper rotating device 30 with a seatback motor control signal (c).

Figure 2:
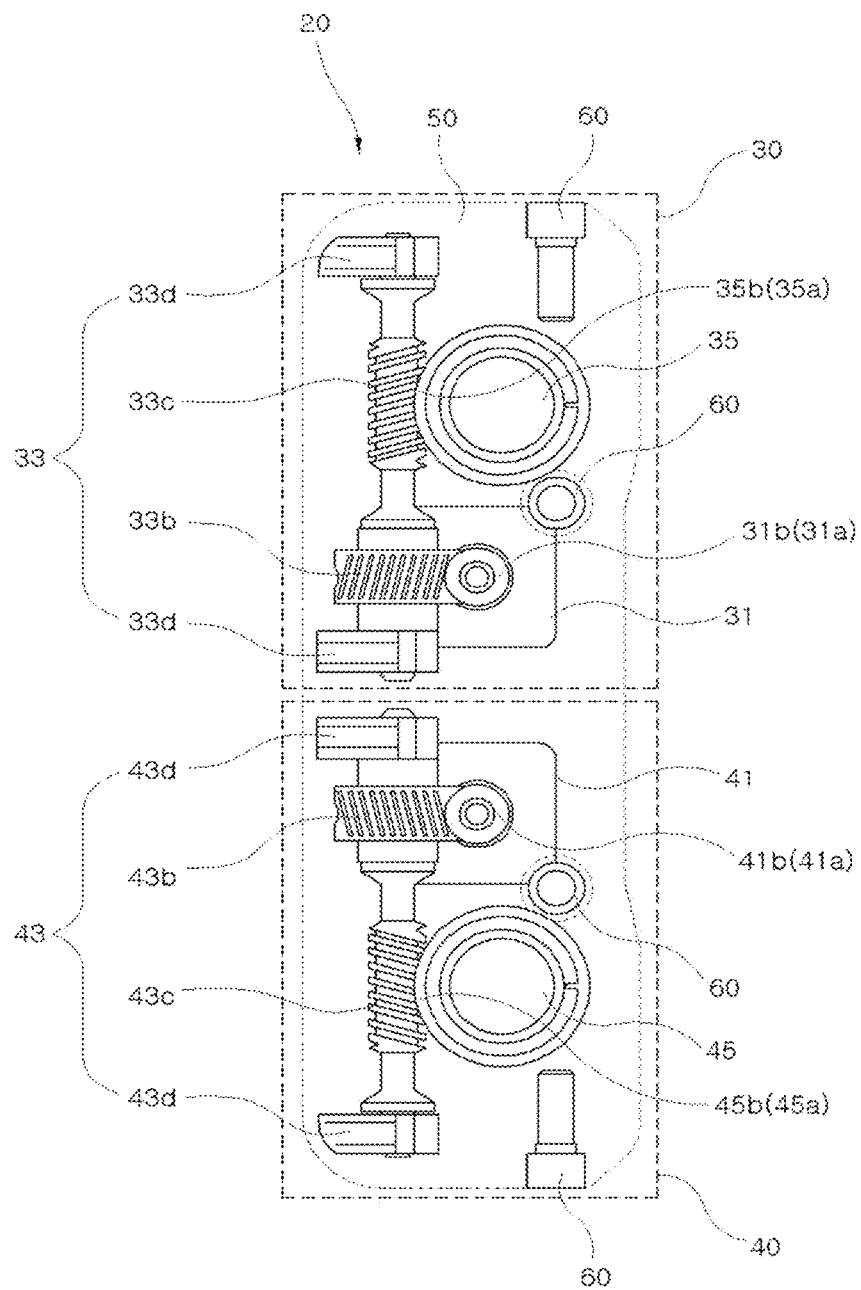
FIG. 2 is an assembly side view illustrating the dual gear type recliner device according to the present disclosure.
Figure 3:
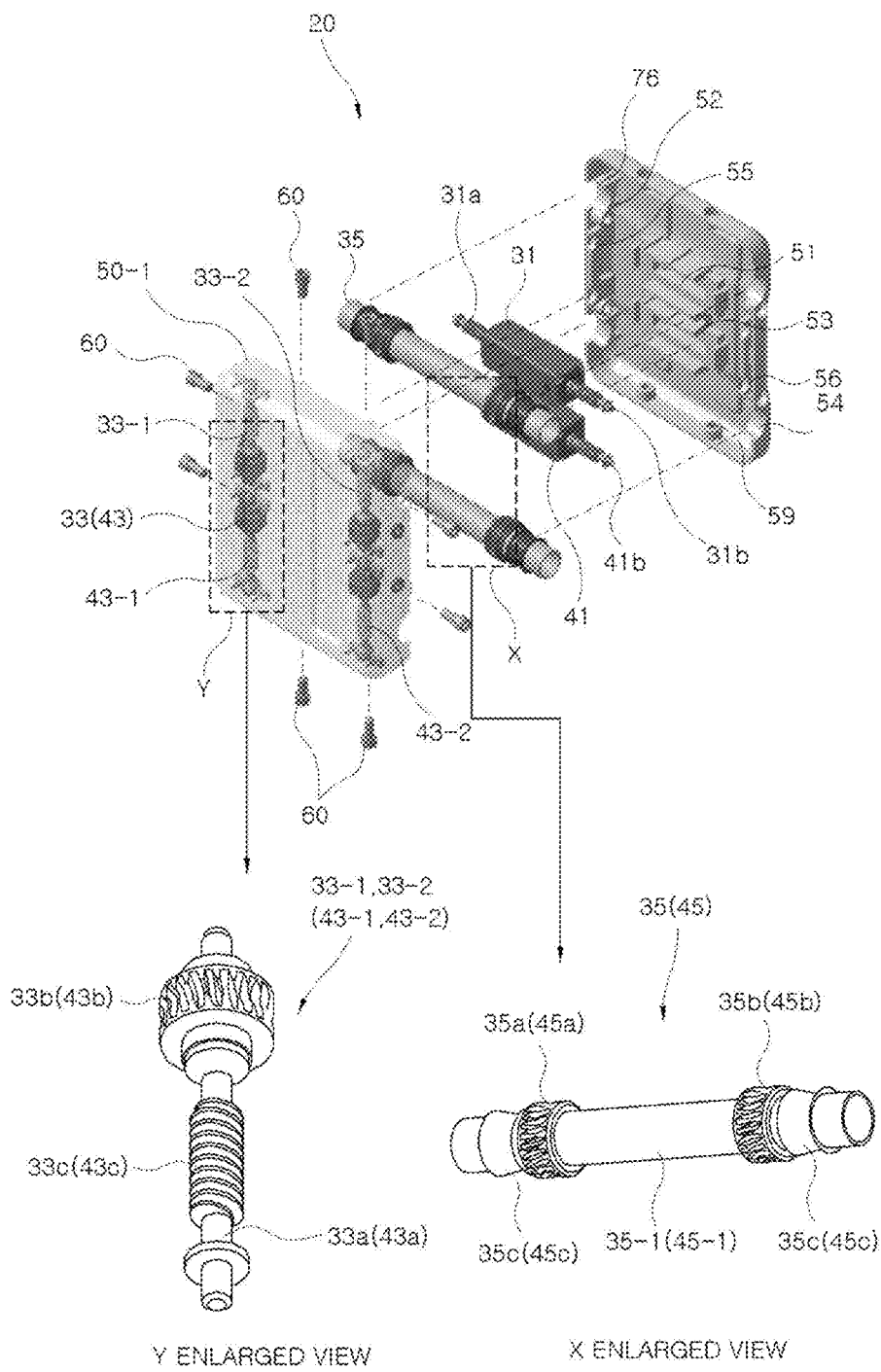
FIG. 3 is an exploded perspective view illustrating the dual gear type recliner device according to the present disclosure.
Figure 4:
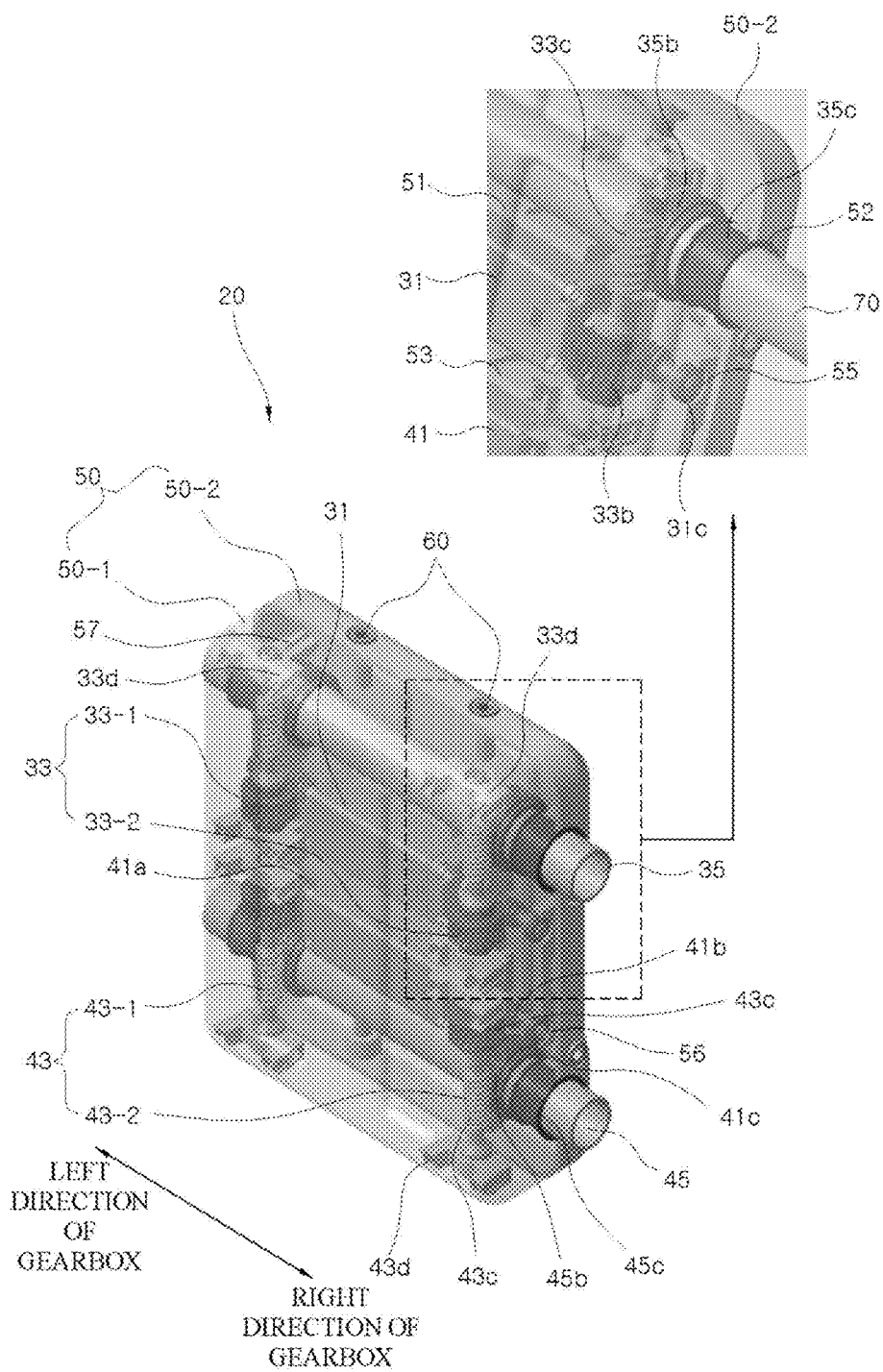
FIG. 4 is an assembly perspective view illustrating the dual gear type recliner device according to the present disclosure.

Meanwhile, FIGS. 2-4 illustrate detailed configurations of the upper rotating device 30, the lower rotating device 40, a gear box 50, and bolts 60 constituting the recliner device 10.

Referring to FIGS. 2 and 3, the upper rotating device 30 and the lower rotating device 40 are located in an inner space of the gear box 50, which is assembled with the bolts 60 so that the inner space of the gear box 50 is divided into an upper inner space in which the upper rotating device 30 is located and a lower inner space in which the lower rotating device 40 is located.

Specifically, the upper rotating device 30 includes a seatback motor 31, a seatback power transmission shaft 33, and a seatback output shaft 35.

For example, the seatback motor 31 performs forward/reverse rotations (or clockwise/counterclockwise rotations) in response to the seatback motor control signal (c) of the controller 90 (see FIG. 1). Left and right motor shaft worms 31a and 31b are provided in two left and right sides of a motor housing of the seatback motor 31. In this embodiment, a general electric motor or a step motor may be applied as the seatback motor 31.

In an embodiment, the left motor shaft worm 31a and the right motor shaft worm 31b output a rotation in the same rotation direction as the seatback motor 31. The same rotation direction output makes both sides of the seatback motor 31 have the same gear condition to contribute to increasing strength of a worm gear (or a braking force) against an external force acting on the seatback 5. In addition, a distal end portion of each of the left motor shaft worm 31a and the right motor shaft worm 31b is supported on a motor bearing 31c (see FIG. 4).

Specifically, the seatback power transmission shaft 33 includes a first seatback power transmission shaft 33-1 and a second seatback power transmission shaft 33-2. Hereinafter, in order to discriminate an arrangement position of the first seatback power transmission shaft 33-1 from an arrangement position of the second seatback power transmission shaft 33-2, it is described such that the first seatback power transmission shaft 33-1 is referred to as a left seatback power transmission shaft 33-1, and the second seatback power transmission shaft 33-2 is referred to as a right seatback power transmission shaft 33-2.

In one embodiment, each of the left seatback power transmission shaft 33-1 and the right seatback power transmission shaft 33-2 includes a shaft rod 33a, a lower end rod worm wheel 33b, an upper end rod worm 33c, and a shaft end holder 33d.

For example, the shaft rod 33a is formed in a straight-line shape having a predetermined length. The lower end rod worm wheel 33b is formed in a lower section in a straight length of the shaft rod 33a to be engaged with the left motor shaft worm 31a of the seatback motor 31. The upper end rod worm 33c is formed in an upper section in the straight length of the shaft rod 33a to be engaged with the right motor shaft worm 31b of the seatback motor 31.

For example, the shaft end holder 33d supports a distal end portion of the straight length of the shaft rod 33a extending from each of the lower end rod worm wheel 33b and the upper end rod worm 33c in a free end support structure. The shaft end holder 33d is engaged with a hook 57 provided in a rear case 50-2 of the gear box 50 to maintain a fixing force.

Specifically, the seatback output shaft 35 includes a pipe shaft 35-1, left and right pipe worm wheels 35a and 35b, and a pipe bearing 35c.

For example, the pipe shaft 35-1 is formed in a hollow pipe structure having a predetermined length. The left and right pipe worm wheels 35a and 35b are formed at a distal portion of one side of the pipe shaft 35-1 and divided into a left pipe worm wheel 35a engaged with the upper end rod worm 33c of the left seatback power transmission shaft 33-1 and a right pipe worm wheel 35b engaged with the upper end rod worm 33c of the right seatback power transmission shaft 33-2. The pipe bearing 35c is provided adjacent to each of the left pipe worm wheel 35a and the right pipe worm wheel 35b.

In an embodiment, the pipe shaft 35-1 forms a pipe end in which left and right end portions of the hollow pipe structure extend from the pipe bearing 35c to form the seatback frame 70 and the fixed end hinge point A (see FIG. 1).

Specifically, the lower rotating device 40 includes the cushion motor 41, a cushion power transmission shaft 43, and a cushion output shaft 45.

For example, the cushion motor 41 performs forward/reverse rotations (or clockwise/counterclockwise rotations) in response to the cushion motor control signal (b) of the controller 90 (see FIG. 1). Left and right motor shaft worms 41a and 41b are provided in two left and right sides of a motor housing of the cushion motor 41. In this case, a general electric motor or a step motor may be applied as the cushion motor 41.

In an embodiment, the left motor shaft worm 41a and the right motor shaft worm 41b output a rotation in the same rotation direction as the cushion motor 41. The same rotation direction output makes both sides of the cushion motor 41 have the same gear condition to contribute to increasing strength of a worm gear (or a braking force) against an external force acting on the seatback 5. In addition, a distal end portion of each of the left motor shaft worm 41a and the right motor shaft worm 41b is supported on a motor bearing 41c (see FIG. 4).

Specifically, the cushion power transmission shaft 43 includes a first cushion power transmission shaft 43-1 and a second cushion power transmission shaft 43-2. Hereinafter, in order to discriminate or distinguish an arrangement position of the first cushion power transmission shaft 43-1 from an arrangement position of the second cushion power transmission shaft 43-2, it is described such that the first cushion power transmission shaft 43-1 is referred to as a left cushion power transmission shaft 43-1, and the second cushion power transmission shaft 43-2 is referred to as a right cushion power transmission shaft 43-2.

In an embodiment, each of the left cushion power transmission shaft 43-1 and the right cushion power transmission shaft 43-2 includes a shaft rod 43a, a lower end rod worm wheel 43b, an upper end rod worm 43c, and a shaft end holder 43d.

For example, the shaft rod 43a is formed in a straight-line shape having a predetermined length. The lower end rod worm wheel 43b is formed in a lower section in a straight length of the shaft rod 43a to be engaged with the left motor shaft worm 41a of the cushion motor 41. The upper end rod worm 43c is formed in an upper section in the straight length of the shaft rod 43a to be engaged with the right motor shaft worm 41b of the cushion motor 41.

For example, the shaft end holder 43d supports a distal end portion of the straight length of the shaft rod 43a extending from each of the lower end rod worm wheel 43b and the upper end rod worm 43c in a free end support structure. The shaft end holder 43d is engaged with the hook 57 provided in the rear case 50-2 of the gear box 50 to maintain a fixing force.

Specifically, the cushion output shaft 45 includes a pipe shaft 45-1, left and right pipe worm wheels 45a and 45b, and a pipe bearing 45c.

For example, the pipe shaft 45-1 is formed in a hollow pipe structure having a predetermined length. The left and right pipe worm wheels 45a and 45b are formed at a distal portion of one side of the pipe shaft 45-1 and divided into a left pipe worm wheel 45a engaged with the upper end rod worm 43c of the left cushion power transmission shaft 43-1 and a right pipe worm wheel 45b engaged with the upper end rod worm 43c of the right cushion power transmission shaft 43-2. The pipe bearing 45c is provided adjacent to each of the left pipe worm wheel 45a and the right pipe worm wheel 45b.

In an embodiment, the pipe shaft 45-1 forms a pipe end in which left and right end portions of the hollow pipe structure extend from the pipe bearing 45c to form the cushion frame 80 and the free end hinge point B (see FIG. 1).

Specifically, the gear box 50 is divided into a front case 50-1 and the rear case 50-2 and is assembled due to engagement of the bolts 60 in a state in which the front case 50-1 is fitted into the rear case 50-2.

To this end, the front case 50-1 is formed as an empty space and formed to be fitted into the rear case 50-2. Meanwhile, the rear case 50-2 includes motor holders 51 and 53, pipe holes 52 and 54, motor holes 55 and 56, the hook 57, and a bolt boss 59.

For example, the motor holders 51 and 53 are formed such that two elastic pieces for maintaining a fixing force by being inserted into the motor housing protrude from a bottom surface of the rear case 50-2 and are divided into a seatback motor holder 51 for the seatback motor 31 and a cushion motor holder 53 for the cushion motor 41, which is disposed below the seatback motor holder 51.

For example, the pipe holes 52 and 54 are divided into seatback pipe holes 52 forming a circular shape with semicircles formed in upper portions of the front case 50-1 and the rear case 50-2, and cushion pipe holes 54 forming a circular shape with semicircles formed in lower portions of the front case 50-1 and the rear case 50-2. In addition, the motor holes 55 and 56 are divided into seat motor holes 55, which are provided on both left and right sides of the seatback motor holder 51 of the rear case 50-2 and in which the motor bearing 31c is located, and cushion motor holes 55, which are provided on both left and right sides of the cushion motor holder 52 of the rear case 50-2 and in which the motor bearing 31c is located.

For example, the hook 57 is fitted into to fix the shaft end holders 33d of the left seatback power transmission shaft 33-1 and the right seatback power transmission shaft 33-2 and is fitted into to fix the shaft end holders 43d of the left cushion power transmission shaft 43-1 and the right cushion power transmission shaft 43-2. The hook 57 is formed of two elastic pieces and located in four places on left and right sides of the upper portion and the lower portion.

For example, the bolt bosses 59 protrude from upper/lower/left/right sides of the rear case 50-2 to match protruding grooves protruding from upper/lower/left/right sides of the front case 50-1. Thus, places in which the bolts 60 are screw-engaged are provided. The bolt bosses 59 are configured of eight bolt bosses by being formed two on each of the upper/lower/left/right sides.

Specifically, the bolt 60 is screw-engaged with the bolt boss 59 to fix and assemble the front case 50-1 and the rear case 50-2. In an embodiment, a screw may be applied as the bolt 60.

Referring to an assembled state of the dual gear box module 20 of FIG. 4, an inner space formed by the gear box 50 of the front case 50-1 and the rear case 50-2, which are assembled via the bolts 60, is divided into an upper portion in which the upper rotating device 30 is located, and a lower portion in which the lower rotating device 40 is located.

In an embodiment, pipe ends of the seatback output shaft 35 constituting the upper rotating device 30 and pipe ends of the cushion output shaft 45 constituting the lower rotating device 40 are exposed to the outside on left and right lateral surfaces of the gear box 50. In a state of being exposed, the pipe ends of the seatback output shaft 35 form the seatback frame 70 and the fixed end hinge point A (see FIG. 1), whereas the pipe ends of the cushion output shaft 45 form the cushion frame 80 and the free end hinge point B (see FIG. 1).

In addition, the hooks 57 are engaged with the shaft end holders 33d and 43d to fix the left and right seatback power transmission shafts 33-1 and 33-2 and the left and right cushion power transmission shafts 43-1 and 43-2, and the bolt 60 is screw-engaged with the bolt boss 59 to couple and integrate the front and rear cases 50-1 and 50-2.

In addition, a layout of the dual gear box module 20 is as follows.

For example, the seatback motor 31 is horizontally arranged in an upper portion in the inner space of the gear box 50, and the cushion motor 41 is horizontally arranged in a lower portion in the inner space of the gear box 50. The seatback output shaft 35 is horizontally arranged above the seatback motor 31 in the inner space of the gear box 50, and the cushion output shaft 45 is horizontally arranged below the cushion motor 41 in the inner space of the gear box 50. Therefore, the seatback motor 31, the cushion motor 41, the seatback output shaft 35, and the cushion output shaft 45 are located to be spaced a predetermined interval from each other.

For example, the left seatback power transmission shaft 33-1 and the left cushion power transmission shaft 43-1 are vertically arranged at a left position in the inner space of the gear box 50, and the right seatback power transmission shaft 33-2 and the right cushion power transmission shaft 43-2 are vertically arranged at a right position in the inner space of the gear box 50.

From the above description, a gear coupling of the upper rotating device 30 is as follows.

For example, the left seatback power transmission shaft 33-1 forms a gear engagement with the left motor shaft worm 31a of the seatback motor 31 through the lower end rod worm wheel 33b and forms a gear engagement with the left pipe worm wheel 35a of the seatback output shaft 35 through the upper end rod worm 33c. For example, the right seatback power transmission shaft 33-2 forms a gear engagement with the right motor shaft worm 31b of the seatback motor 31 through the lower end rod worm wheel 33b and forms a gear engagement with the right pipe worm wheel 35b of the seatback output shaft 35 through the upper end rod worm 33c.

In addition, a gear coupling of the lower rotating device 40 is as follows.

For example, the left cushion power transmission shaft 43-1 forms a gear engagement with the left motor shaft worm 41a of the cushion motor 41 through the lower end rod worm wheel 43b and forms a gear engagement with the left pipe worm wheel 45a of the cushion output shaft 45 through the upper end rod worm 43c. For example, the right cushion power transmission shaft 43-2 forms a gear engagement with the right motor shaft worm 41b of the cushion motor 41 through the lower end rod worm wheel 43b and forms a gear engagement with the right pipe worm wheel 45b of the cushion output shaft 45 through the upper end rod worm 43c.

Therefore, an operation of the recliner device 10 is performed by driving the cushion motor 41 and then driving the seatback motor 31. However, the operation of the recliner device 10 may be performed by driving the cushion motor 41 and the seatback motor 31 together. This is because the rotation of the cushion motor 41 moves the gear box 50, whereas the rotation of the seatback motor 31 moves the seatback 5.

For example, the rotation of the cushion motor 41 rotates the left and right cushion power transmission shafts 43-1 and 43-2, and the rotations of the left and right cushion power transmission shafts 43-1 and 43-2 rotate the cushion output shaft 45. Then, the cushion output shaft 45 is freely rotated with respect to the cushion frame 80 at the free end hinge point B (see FIG. 1) so that the gear box 50 is moved in the same rotation direction using the cushion frame 80 as a hinge point.

Subsequently, the rotation of the seatback motor 31 rotates the left and right seatback power transmission shafts 33-1 and 33-2, and the rotations of the left and right seatback power transmission shafts 33-1 and 33-2 rotate the seatback output shaft 35. Then, the seatback output shaft 35 moves the seatback frame 70 in the same rotation direction using the fixed end hinge point A (see FIG. 1) as the hinge point.

The movement of the seatback frame 70 switches the seatback 5 to folding or unfolding according to a direction of the movement thereof.

As described above, the recliner device 10 basically provides folding and unfolding, which are functions required for the recliner. Furthermore, the seatback 5 is folded at a large seatback angle with respect to the seat cushion 4 in addition to the folding/unfolding operation. Thus, it is possible to implement all of the back table mode (see FIG. 5) for securing a front view/table function/large luggage fixing function, the leg rest mode (see FIG. 6) in which the passenger is capable of stretching his or her legs, and an inclination mode (see FIG. 7) in which the freight is inclined.

Therefore, the recliner device 10 is characterized as the dual gear type recliner device 10 due to the dual gear box module 20 so that it is possible to develop seat concepts suitable for future autonomous vehicles.

Figure 5:
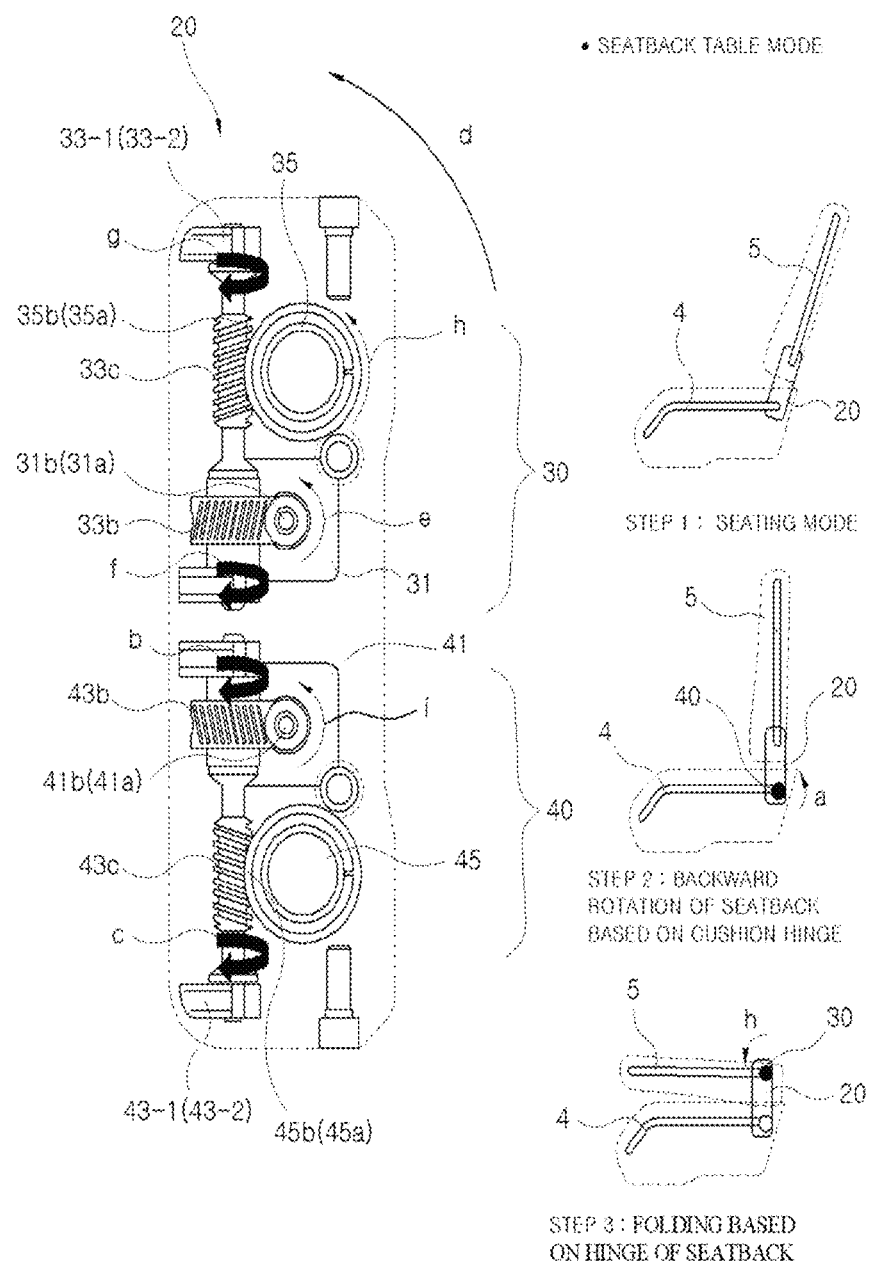
FIG. 5 is a diagram illustrating a state in which a vehicle seat implements a back table mode using the dual gear type recliner device according to the present disclosure.
Figure 6:
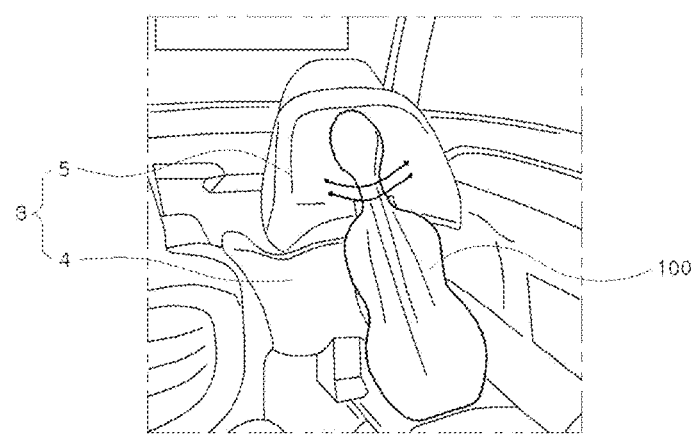
FIG. 6 is a diagram illustrating a state in which the vehicle seat implements an inclination mode using the dual gear type recliner device according to the present disclosure.
Figure 7:
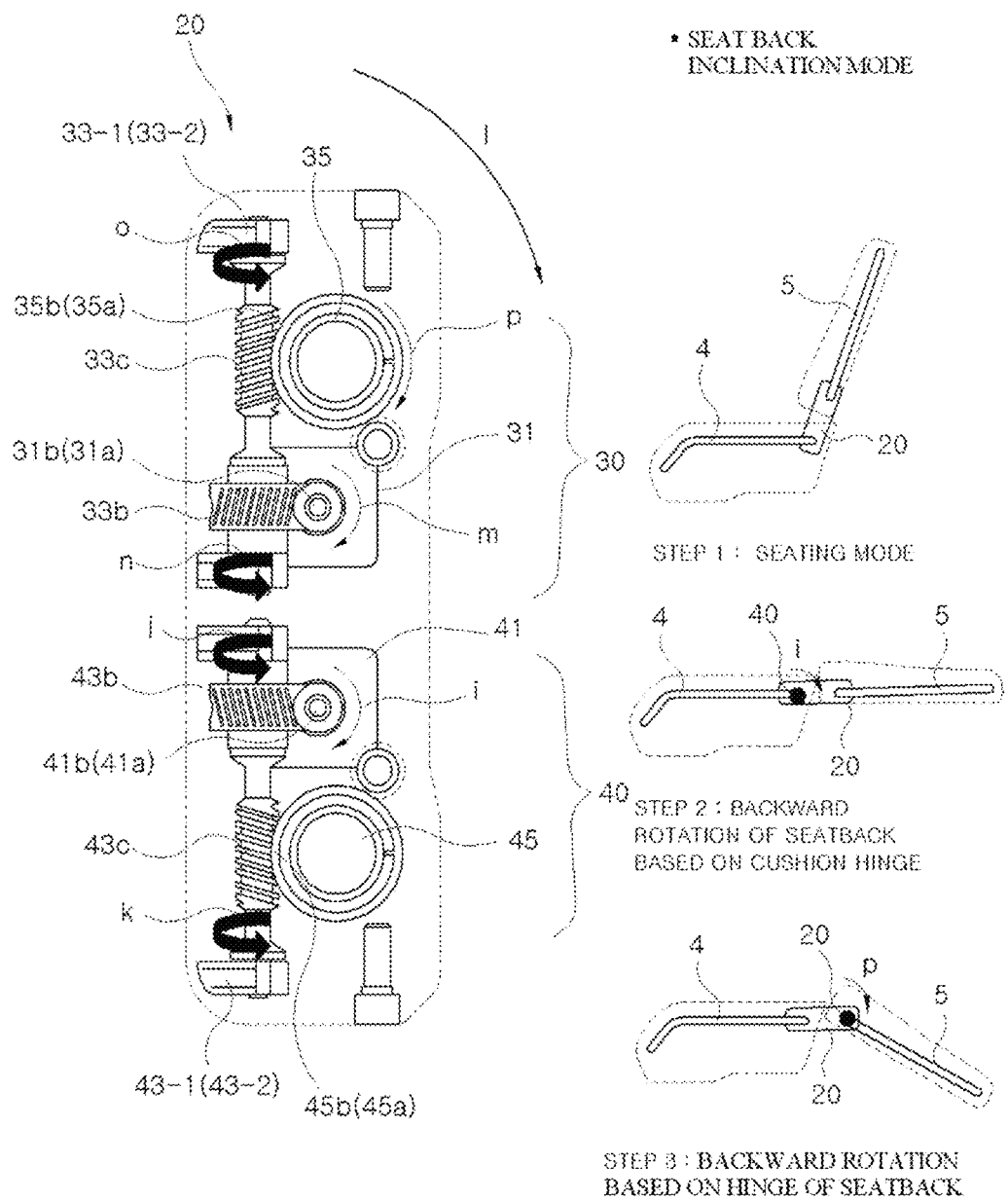
FIG. 7 is a diagram illustrating a state in which a vehicle seat implements a leg rest mode using the dual gear type recliner device according to the present disclosure.

Meanwhile, FIGS. 5-7 illustrate examples in which the recliner device 10 is operated in the back table mode (FIG. 5), the leg rest mode (FIG. 6), and the inclination mode (FIG. 7).

In the back table mode of FIG. 5, power transmission is performed in the order of the cushion motor 41→the left and right cushion power transmission shafts 43-1 and 43-2→the cushion output shaft 45→the gear box 50→the seatback 5→the seatback motor 31→the seatback power transmission shaft 33→the seatback output shaft 35→the seatback frame 70→the seatback 5. In the foregoing, "→" means a power transmission flow sequence.

For example, the cushion motor 41 becomes a counterclockwise cushion motor rotation state a in response to the cushion motor control signal (b) of the controller 90 (see FIG. 1). Also, the left and right cushion power transmission shafts 43-1 and 43-2 become a clockwise cushion worm wheel rotation state b rotated at an angle of 90° through the lower end rod worm wheel 43b engaged with the left and right motor shaft worms 41a and 41b of the cushion motor 41. Further, the upper end rod worm 43c becomes a clockwise cushion worm rotation state c. The clockwise cushion worm rotation state c allows the cushion output shaft 45 to be rotated in the clockwise direction through left and right pipe worm wheels 45a and 45b engaged with the upper end rod worm 43c.

However, the cushion output shaft 45 forms the cushion frame 80 and the free end hinge point B (see FIG. 1) so that the clockwise rotation of the cushion output shaft 45 moves the gear box 50.

Then, the movement of the gear box 50 is transferred to the seatback output shaft 35 and the seatback frame 70 forming the fixed end hinge point A (see FIG. 1). Thus, the seatback 5 is converted to a folded rotation state d so that the seatback 5 is switched from STEP 1 to a folded state as STEP 2 in which the seatback 5 is raised up and erected on the seat cushion 4.

Subsequently, the seatback motor 31 becomes a counterclockwise seatback motor rotation state e in response to the seatback motor control signal (c) of the controller 90 (see FIG. 1). Also, the left and right seatback power transmission shafts 33-1 and 33-2 become a clockwise seatback worm wheel rotation state f rotated at an angle of 90° through the lower end rod worm wheel 33b engaged with the left and right motor shaft worms 31a and 31b of the seatback motor 31. Further, the upper end rod worm 33c becomes a clockwise seatback worm rotation state g. The clockwise seatback worm rotation state g allows the seatback output shaft 35 to become a clockwise seatback output shaft rotation state h through the left and right pipe worm wheels 35a and 35b engaged with the upper rod worm 33c.

Then, the seatback output shaft 35 forms the seatback frame 70 and the fixed end hinge point A (see FIG. 1). Thus, the seatback frame 70 is moved together with the gear box 50 in the seatback output shaft rotation state h of the seatback output shaft 35. The movement of the seatback frame 70 further lowers the seatback 5 to the seat cushion 4. Thus, the seatback 5 is switched from STEP 2 to a back table state as STEP 3 in which the seatback 5 is completely superposed on the seat cushion 4.

As described above, in the back table mode, the seatback 5 is completely superposed on the seat cushion 4 with a combination of the cushion motor 41 and the seatback motor 31 so that it is possible to secure a front view and perform a table function and a large luggage fixing function.

In addition, referring to the inclination mode of FIG. 6, the inclination mode is a state in which the seatback 5 is not completely superposed on the seat cushion 4 during the back table mode so that the inclination of the seatback 5 is formed to be smaller than the inclination of the back table mode.

Therefore, it can be seen that the inclination mode is implemented by lowering strength of a current applied in response to the seatback motor control signal (c) (refer to FIG. 1) of the controller 90 or shortening an application of an output duty.

As described above, in the inclination mode, the seatback 5 is slightly inclined toward the seat cushion 4 so that a freight 100 having a long length may be leaned against the seatback 5 in a state of being placed on a bottom (e.g., a floor panel) of a vehicle body.

Meanwhile, in the leg rest mode of FIG. 7, power transmission is performed in the order of the cushion motor 41→the left and right cushion power transmission shafts 43-1 and 43-2→the cushion output shaft 45→the gear box 50→the seatback 5→the seatback motor 31→the seatback power transmission shaft 33→the seatback output shaft 35→the seatback frame 70→the seatback 5. In the foregoing, "→" means a power transmission flow sequence.

As described above, in the leg rest mode, the motor rotation direction and the gear rotation direction are formed opposite to those of the back table mode so that there is a difference that the seatback 5 is unfolded from the seat cushion 4. An operation sequence of the leg rest mode is the same as an operation sequence of the back table mode. Therefore, there is a difference that the controller 90 uses the cushion motor control signal (b) and the seatback motor control signal (c) as (+) current signals in the back table mode, whereas the controller 90 uses the cushion motor control signal (b) and the seatback motor control signal (c) as (−) current signals in the leg rest mode.

For example, the cushion motor control signal (b) of the controller 90 (see FIG. 1) switches the cushion motor 41 to a clockwise cushion motor rotation state (i). A gear engagement between the left and right motor shaft worms 41a and 41b of the cushion motor 41 and the lower end rod worm wheel 43b of the left and right cushion power transmission shafts 43-1 and 43-2 switches the left and right cushion power transmission shafts 43-1 and 43-2 to a counterclockwise cushion worm wheel rotation state j rotated at an angle of 90° and switches the upper end rod worm 43c to a counterclockwise cushion worm rotation state k.

Then, the cushion output shaft 45 switches the counterclockwise cushion worm rotation state k of the left and right cushion power transmission shafts 43-1 and 43-2 to the clockwise rotation state in which the left and right pipe worm wheels 45a and 45b engaged with the upper end rod worm 43c are rotated again at the angle of 90°. The clockwise rotation of the cushion output shaft 45 is converted into the movement of the gear box 50 through the free end hinge point B (see FIG. 1).

Consequently, the seatback 5 is switched to an unfolding rotation state 1 through the seatback frame 70 to which the movement of the gear box 50 is transmitted through the seatback output shaft 35 and the fixed end hinge point A (see FIG. 1) so that the seatback 5 is switched from STEP 1 to a folded state as STEP 2 in which the seatback 5 is moved downward with respect to the seat cushion 4 to be unfolded.

Subsequently, the seatback motor control signal (c) of the controller 90 (see FIG. 1) switches the seatback motor 31 to a clockwise cushion motor rotation state m. A gear engagement between the left and right motor shaft worms 31a and 31b of the seatback motor 31 and the lower end rod worm wheel 33b of the left and right seatback power transmission shafts 33-1 and 33-2 switches the left and right seatback power transmission shafts 33-1 and 33-2 to a counterclockwise seatback worm wheel rotation state n rotated at an angle of 90° and switches the upper end rod worm 33c to a counterclockwise cushion worm rotation state o.

Then, the seatback output shaft 35 switches the counterclockwise cushion worm rotation state o of the left and right seatback power transmission shafts 33-1 and 33-2 to a seatback output shaft rotation state p in which left and right pipe worm wheels 35a and 35b engaged with the upper end rod worm 33c are rotated again at the angle of 90°. The seatback output shaft rotation state p of the cushion output shaft 45 is switched to the movement of the seatback frame 70 with the gear box 50 through the fixed end hinge point A (see FIG. 1).

As a result, the movement of the seatback frame 70 further lowers the seatback 5 toward the seat cushion 4 so that the seatback 5 is switched from STEP 2 to a full flat state as STEP 3 in which the seatback 5 is completely tilted backward from the seat cushion 4.

As described above, in the leg rest mode, the seatback 5 is completely bent from the seat cushion 4 in the full flat state due to a combination of the cushion motor 41 and the seatback motor 31 so that the passenger may stretch his or her legs.

As described above, the dual gear type recliner device 10 applied to the seat 3 of the vehicle 1 according to the present embodiment forms the hinge structure for the folding and unfolding in the intermediate section of a width of the seatback 5 in which the folding and unfolding are performed with respect to the seat cushion 4. The hinge structure forms the fixed end hinge point A with the seatback frame 70 of the seatback 5 to impart folding and unfolding movement to the seatback 5. Meanwhile, the hinge structure forms the free end hinge point B with the cushion frame 80 of the seat cushion 4. The hinge structure includes the recliner device 10 for blocking the movements of the cushion frame 80 and the seat cushion 4 and includes a controller 90 for outputting the cushion motor control signal (b) for driving the cushion motor 41 of the recliner device 10 and the seatback motor control signal (c) for driving the seatback motor 31 of the recliner device 10 to generate the folding and unfolding movements.

Therefore, the dual gear type recliner device 10 may integrate the upper and lower two drivers 30 and 40 into one device through a dual gear method to improve the degree of freedom in designing an outer circumference of the seat 3. More particularly, the upper and lower two driver 30 and 40 are built in the gear box 50 arranged in the central portion to perform a large angle adjustment with respect to the seatback 5 with the dual gear integrated structure of the motor and the reduction gear. Thus, the back table mode and the leg rest mode, which are suitable for future autonomous vehicles, may be easily implemented.

The recliner device applied to the vehicle seat according to the present disclosure implements the following actions and effects.

First, since the recliner device is configured as a dual gear type recliner device, structural simplification/material cost reduction/weight reduction are possible compared to the existing double recliner device. Second, owing to the dual gear type integrated structure, the upper/lower rotating shafts operate by being interlocked with each other so that the seatback can be pivoted in a condition in which there is no mutual interference between the seatback and the seat cushion, and thus the designs of the seatback and the seat cushion cannot be affected. Third, owing to the dual gear type integrated structure in which the motor and the reduction gear are applied to the gearbox module in which the upper and lower two drivers are disposed in a central portion thereof, an angle of the seatback can be easily adjusted and can be varied to a large angle. Fourth, since the seatback is folded at a large angle, it is possible to implement a back table mode for securing a front view/table function/large luggage fixing function, a leg rest mode in which a passenger can stretch his or her legs, and an inclination mode in which a luggage is leaned. Fifth, since the back table mode, the leg rest mode, and the inclination mode can be implemented, a seat concept suitable for future autonomous vehicles can be easily implemented.

While the present disclosure has been described with reference to the accompanying drawings, it should be apparent to those having ordinary skill in the art that various changes and modifications may be made without departing from the spirit and scope of the present disclosure without being limited to the specific embodiments disclosed herein. Accordingly, it should be noted that such alternations or modifications fall within the claims of the present disclosure, and the scope of the present disclosure should be construed on the basis of the appended claims.

What is claimed is:

1. A recliner device, comprising:
a dual gear box module provided in a connection portion at a position of an intermediate section of a width between a seat cushion in which a cushion frame is built and a seatback in which a seatback frame is built,
wherein the dual gear box module is configured to form a free end hinge point with the cushion frame to block a movement of the cushion frame and to form a fixed end hinge point with the seatback frame to allow the seatback to be folded or unfolded with respect to the seat cushion due to a movement of the seatback frame,
wherein the dual gear box module includes
an upper rotating device formed such that the fixed end hinge point is connected to left and right portions of the seatback frame,
a lower rotating device formed such that the free end hinge point is connected to left and right portions of the cushion frame, and
a gear box having an inner space configured to accommodate the upper rotating device and the lower rotating device, and
wherein the upper rotating device is located upward in the inner space and the lower rotating device is located downward in the inner space.

2. The recliner device of claim 1, wherein the upper rotating device includes:
a seatback motor;
a seatback power transmission shaft configured to switch a rotation direction of the seatback motor; and
a seatback output shaft configured to match a rotation direction of the seatback power transmission shaft to the rotation direction of the seatback motor and generate a movement in the seatback frame.

3. The recliner device of claim 2, wherein:
the seatback motor and the seatback output shaft may be horizontally arranged to form a separation gap from each other; and
the seatback power transmission shaft is vertically arranged with respect to the seatback motor and the seatback output shaft to form a gear engagement structure and receives a rotation from the seatback motor to transmit the rotation to the seatback output shaft in the gear engagement structure.

4. The recliner device of claim 3, wherein:
the seatback power transmission shaft includes a first seatback power transmission shaft and a second seatback power transmission shaft; and
each of the first seatback power transmission shaft and the second seatback power transmission shaft forms the gear engagement structure.

5. The recliner device of claim 4, wherein:
the first seatback power transmission shaft forms a lower end rod worm wheel engaged with a left motor shaft worm of the seatback motor and an upper end rod worm engaged with a left pipe worm wheel of the seatback output shaft; and
the second seatback power transmission shaft forms a lower end rod worm wheel engaged with a right motor shaft worm of the seatback motor and an upper end rod worm engaged with a right pipe worm wheel of the seatback output shaft.

6. The recliner device of claim 2, wherein each of the seatback motor and the seatback output shaft is fitted into an elastic piece protruding in the inner space of the gear box to form a fixing force.

7. The recliner device of claim 2, wherein the seatback motor and the seatback output shaft are supported on bearings on both left and right lateral portions of the gear box.

8. The recliner device of claim 2, wherein the seatback power transmission shaft is supported on a shaft end holder fitted into a hook protruding in the inner space of the gear box.

9. The recliner device of claim 1, wherein the lower rotating device includes:
a cushion motor;
a cushion power transmission shaft configured to switch a rotation direction of the cushion motor; and
a cushion output shaft configured to match a rotation direction of the cushion power transmission shaft to the rotation direction of the cushion motor to be freely rotated with respect to the cushion frame.

10. The recliner device of claim 9, wherein:
the cushion motor and the cushion output shaft are horizontally arranged to form a separation gap from each other; and
the cushion power transmission shaft is vertically arranged with respect to the cushion motor and the cushion output shaft to form a gear engagement structure and receives a rotation from the cushion motor to transmit the rotation to the cushion output shaft in the gear engagement structure.

11. The recliner device of claim 10, wherein:
the cushion power transmission shaft includes a first cushion power transmission shaft and a second cushion power transmission shaft; and
each of the first cushion power transmission shaft and the second cushion power transmission shaft forms the gear engagement structure.

12. The recliner device of claim 11, wherein:
the first cushion power transmission shaft forms a lower end rod worm wheel engaged with a left motor shaft worm of the cushion motor and an upper end rod worm engaged with a left pipe worm wheel of the cushion output shaft; and
the second cushion power transmission shaft forms a lower end rod worm wheel engaged with a right motor shaft worm of the cushion motor and an upper end rod worm engaged with a right pipe worm wheel of the cushion output shaft.

13. The recliner device of claim 9, wherein each of the cushion motor and the cushion output shaft is fitted into an elastic piece protruding in the inner space of the gear box to form a fixing force.

14. The recliner device of claim 9, wherein the cushion motor and the cushion output shaft are supported on bearings on both left and right lateral portions of the gear box.

15. The recliner device of claim 9, wherein the cushion power transmission shaft is supported on a shaft end holder fitted into a hook protruding in the inner space of the gear box.

16. The recliner device of claim 1, wherein:
the gear box includes a front case and a rear case; and
the inner space is formed due to a coupling of the front case and the rear case.

17. The recliner device of claim 1, wherein:
the folding is performed such that the seatback is superposed on the seat cushion through back folding; and
the unfolding is performed such that the seatback is tilted from the seat cushion in a full flat state.

* * * * *